(12) United States Patent
Kim

(10) Patent No.: US 7,929,058 B2
(45) Date of Patent: Apr. 19, 2011

(54) DIGITAL VIDEO PROCESSING APPARATUS AND CONTROL METHOD THEREOF

(75) Inventor: Jae-cheol Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1179 days.

(21) Appl. No.: 11/490,032

(22) Filed: Jul. 21, 2006

(65) Prior Publication Data
US 2007/0019112 A1 Jan. 25, 2007

(30) Foreign Application Priority Data

Jul. 22, 2005 (KR) ........................ 10-2005-0066852

(51) Int. Cl.
*H04N 5/01* (2006.01)
*H04N 9/68* (2006.01)
*H04N 9/77* (2006.01)
*H04N 9/78* (2006.01)

(52) U.S. Cl. ........ 348/607; 348/609; 348/624; 348/646; 348/663; 348/665; 348/667

(58) Field of Classification Search .................. 348/607, 348/609, 624, 646, 663, 665, 666, 667
See application file for complete search history.

(56) References Cited

U.S. PATENT DOCUMENTS

| | | | | |
|---|---|---|---|---|
| 4,646,138 A | * | 2/1987 | Willis | 348/621 |
| 5,355,176 A | * | 10/1994 | Inagaki et al. | 348/609 |
| 5,805,238 A | * | 9/1998 | Raby et al. | 348/609 |
| 5,909,255 A | * | 6/1999 | Hatano | 348/663 |
| 6,018,373 A | * | 1/2000 | Hanai | 348/630 |
| 6,052,157 A | * | 4/2000 | Weihs | 348/663 |
| 6,956,620 B2 | * | 10/2005 | Na | 348/663 |
| 7,012,651 B2 | * | 3/2006 | Kondo et al. | 348/624 |
| 7,106,385 B1 | * | 9/2006 | Keen | 348/607 |
| 7,280,159 B2 | * | 10/2007 | Chao | 348/609 |
| 7,355,655 B2 | * | 4/2008 | Chang et al. | 348/641 |
| 7,420,624 B2 | * | 9/2008 | Lin et al. | 348/663 |
| 7,432,987 B2 | * | 10/2008 | Shan et al. | 348/667 |
| 7,532,254 B1 | * | 5/2009 | Woodall | 348/609 |
| 7,545,442 B2 | * | 6/2009 | Huang et al. | 348/663 |
| 7,554,610 B2 | * | 6/2009 | Zhu | 348/609 |
| 7,567,300 B2 | * | 7/2009 | Satou et al. | 348/609 |

FOREIGN PATENT DOCUMENTS

| | | |
|---|---|---|
| CN | 1148966 C | 12/1997 |
| KR | 90-002625 | 4/1990 |
| KR | 1998-079568 | 11/1998 |
| KR | 1999-0039345 | 6/1999 |
| KR | 10-2003-0023364 A | 3/2003 |
| KR | 10-2003-0058194 A | 7/2003 |
| WO | WO 97/49247 | 12/1997 |

* cited by examiner

*Primary Examiner* — Brian Yenke
(74) *Attorney, Agent, or Firm* — Roylance, Abrams, Berdo & Goodman, LLP

(57) ABSTRACT

A digital video processing apparatus and a control method thereof are provided, and include a signal receiving part for receiving a digital video signal, a decoder for separating a luminance signal from the digital video signal, and a filtering part for filtering the luminance signal separated in the decoder to substantially remove an interference signal contained in the luminance signal. Thus, the digital video processing apparatus can filter out interference signals contained in a luminance signal of a digital video signal.

14 Claims, 3 Drawing Sheets

----- LUMINANCE SIGNAL
——— INTERFERENCE SIGNAL

DIGITAL VIDEO PROCESSING APPARATUS AND CONTROL METHOD THEREOF

CROSS-REFERENCE TO RELATED APPLICATIONS

This application claims the benefit under 35 U.S.C. §119(a) of Korean Patent Application No. 10-2005-0066852, filed in the Korean Intellectual Property Office on Jul. 22, 2005, the entire disclosure of which is incorporated herein by reference.

BACKGROUND OF THE INVENTION

1. Field of the Invention

The present invention relates to a digital video processing apparatus and a control method thereof. More particularly, the present invention relates to a digital video processing apparatus for processing digital video signals including luminance signals, and a control method thereof.

2. Description of the Related Art

Recently, digital TVs in which images are displayed on a display based on digital video signals have become widely used. A digital video signal transmitted to a digital TV includes a luminance signal depending on brightness of an image, and a color difference signal. A digital RGB signal may be produced based on these luminance and color difference signals.

However, noises may be contained in the luminance signal included in the digital video signal transmitted to the digital TV. Particularly in a case where an image is photographed using a camera for analog video signal, the color difference signal may remain in the luminance signal without being separated from the luminance signal. The color difference signal remaining in the luminance signal is hereinafter referred to as a color difference noise.

If the color difference noise is contained in the luminance signal, the conventional digital video processing apparatus such as the digital TV can encounter problems such as dot crawl, hanging dot, and so forth.

Accordingly, a need exists for a system and method for efficiently and effectively filtering interference signals contained in a digital video signal.

SUMMARY OF THE INVENTION

Accordingly, it is an aspect of embodiments of the present invention to substantially solve the above and other problems, and provide a digital video processing apparatus, which is capable of filtering out interference signals contained in a luminance signal of a digital video signal, and a control method thereof.

The above and other aspects of embodiments of the present invention are achieved by providing a digital video processing apparatus comprising a signal receiving part for receiving a digital video signal, a decoder for separating a luminance signal from the digital video signal, and a filtering part for filtering the luminance signal separated in the decoder to remove an interference signal contained in the luminance signal.

According to embodiments of the present invention, the digital video processing apparatus further comprises a displaying part, wherein the filtering part outputs the digital video signal based on the filtered luminance signal to the displaying part.

According to embodiments of the present invention, the filtering part comprises at least one of a low pass filter and a notch filter.

According to embodiments of the present invention, the digital video processing apparatus further comprises a controlling part for determining a gain variation of the luminance signal for each frame, and controlling the filtering part such that a region of the luminance signal to filter is adjusted based on the determined gain variation.

According to embodiments of the present invention, the filtering part comprises at least one of a low pass filter and a notch filter, and further comprises a controlling part for determining a gain variation of the luminance signal for each frame, and controlling one of the low pass filter and the notch filter included in the filtering part to filter the luminance signal based on the determined gain variation.

According to embodiments of the present invention, the controlling part comprises a motion determining part for determining motion of an object between respective frames and determining the gain variation of the luminance signal based on a result of the determination of the motion determining part.

The above and other aspects of embodiments of the present invention are also achieved by providing a method of controlling a digital video processing apparatus, comprising receiving a digital video signal, separating a luminance signal from the digital video signal, and filtering the separated luminance signal to remove an interference signal contained in the luminance signal.

According to embodiments of the present invention, the method of filtering the separated luminance signal comprises passing only the luminance signal having a predetermined frequency.

According to embodiments of the present invention, the method of filtering the separated luminance signal comprises determining a gain variation of the luminance signal for each frame, and adjusting a region of the luminance signal to filter based on the determined gain variation.

According to embodiments of the present invention, the method of filtering the separated luminance signal comprises determining motion of an object between frames, and determining the gain variation of the luminance signal based on the determined motion of the object.

BRIEF DESCRIPTION OF THE DRAWINGS

The above and/or other aspects and advantages of embodiments of the present invention will become apparent and more readily appreciated from the following description of the embodiments, taken in conjunction with the accompanying drawings, of which.

Throughout the drawings, like reference numerals will be understood to refer to like parts, components and structures.

DETAILED DESCRIPTION OF THE EXEMPLARY EMBODIMENTS

Reference will now be made in detail to exemplary embodiments of the present invention, examples of which are illustrated in the accompanying drawings.

Figure 1:
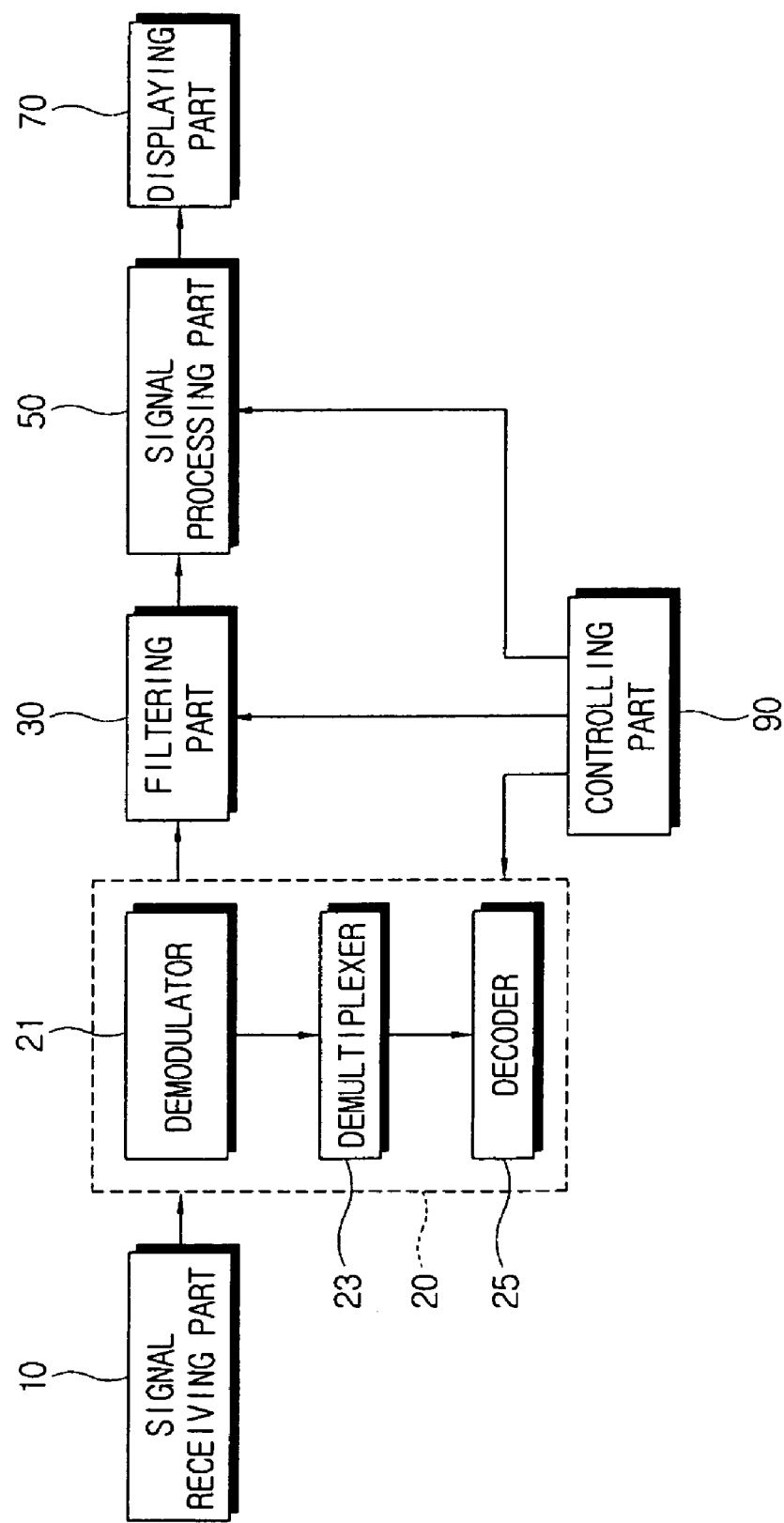
FIG. 1 is an exemplary control block diagram of a digital video processing apparatus according to an embodiment of the present invention.

Referring to FIG. 1, a digital video processing apparatus according to embodiments of the present invention comprises a signal receiving part 10 for receiving a digital broadcasting signal, a signal converting part 20 for converting a broadcasting signal received from the signal receiving part 10, a filtering part 30 for filtering some of the broadcasting signal converted in the signal converting part 20, a signal processing part 50 for processing the broadcasting signal filtered in the filtering part 30, and a controlling part 90 for controlling these components. The digital video processing apparatus can further comprise a displaying part 70.

The digital broadcasting signal is transmitted in the form of a transport stream, which is packetized by multiplexing a video signal, an audio signal, and data and information in time division.

The signal receiving part 10 comprises a tuner (not shown) and receives the digital broadcasting signal containing the video signal through an antenna (not shown). The tuner tunes the received digital broadcasting signal to a broadcasting signal having a corresponding frequency band based on a tuning control signal from the controlling part 90, which is described in greater detail below.

The signal converting part 20 converts the broadcasting signal tuned in the tuner into a signal having a format which can be displayed on the displaying part 70. Here, the signal converting part 20 can comprise a demodulator 21, a demultiplexer 23, and a decoder 25.

The demodulator 21 demodulates the broadcasting signal of a specified channel, which is tuned in the tuner, performs error correction for the demodulated broadcasting signal, and outputs the error-corrected broadcasting signal in the form of a transport stream. The demultiplexer 23 demultiplexes the broadcasting signal input in the form of a transport stream into the video signal, the audio signal and various additional data, and outputs these signals and data in the form of a bit stream.

The decoder 25 decodes the video signal output from the demultiplexer 23. At this time, the video signal is separated into a luminance signal, a color difference signal, and so forth.

The filtering part 30 substantially filters out an interference signal contained in the luminance signal. Here, the filtering part 30 may comprise any of a variety of filters such as a low pass filter, a notch filter, and so forth.

Here, the interference signal refers to noises contained in the luminance signal. Particularly, the interference signal may contain a color difference noise left in the luminance signal without being separated from the luminance signal in a step of separating/generating the color difference signal and the luminance signal before an external source, e.g., a broadcasting station, transmits the broadcasting signal.

The signal processing part 50 processes the video signal decoded in the decoder 25, as well as the luminance signal filtered in the filtering part 30, and outputs these processed signals to the displaying part 70. Here, the signal processing part 50 comprises a scaler for converting the video signal to correspond with a vertical frequency, resolution, aspect ratio, and so forth, according to an output format of the displaying part 70.

The displaying part 70 can comprise any of various types of display modules such as a DLP (digital light processing), LCD (liquid crystal display), PDP (plasma display panel), and so forth.

The controlling part 90 controls the above-mentioned components such that the video signal input from the external source is displayed on the displaying part 70.

The controlling part 90 controls the filtering part 30 to filter the luminance signal input to the filtering part 30. At this time, in a case where the filtering part 30 comprises a low pass filter, the controlling part 90 may control the filtering part 30 to pass only a luminance signal having frequencies less than a predetermined frequency among the luminance signal input to the filtering part 30, such that the luminance signal is displayed on the displaying part 70. In addition, in a case where the filtering part 30 comprises a notch filter, the controlling part 90 may control the filtering part 30 to remove a luminance signal having a predetermined frequency, such that only a luminance signal having frequencies other than the predetermined frequency is displayed on the displaying part 70.

The controlling part 90 can also determine a gain variation of the luminance signal and control the filtering part 30 based on the determined gain variation. Here, for example, the controlling part 90 comprises a motion determining part for determining motion of an object in a moving picture and determines the gain variation of the luminance signal by measuring and estimating motion between respective frames. That is, the controlling part 90 can determine motion of an object for each frame corresponding to a vertical synchronization frequency of the video signal, estimate a value of the gain variation of the luminance signal based on the determined motion, and control the filtering part 30 based on the estimated value.

The controlling part 90 can then control the filtering part 30 based on the gain variation of the luminance signal for each frame. Specifically, the controlling part 90 can determine which filter is to be used, that is, the notch filter or the low pass filter of the filtering part 30, and control a region to be filtered in the filtering part 30.

Figure 2:
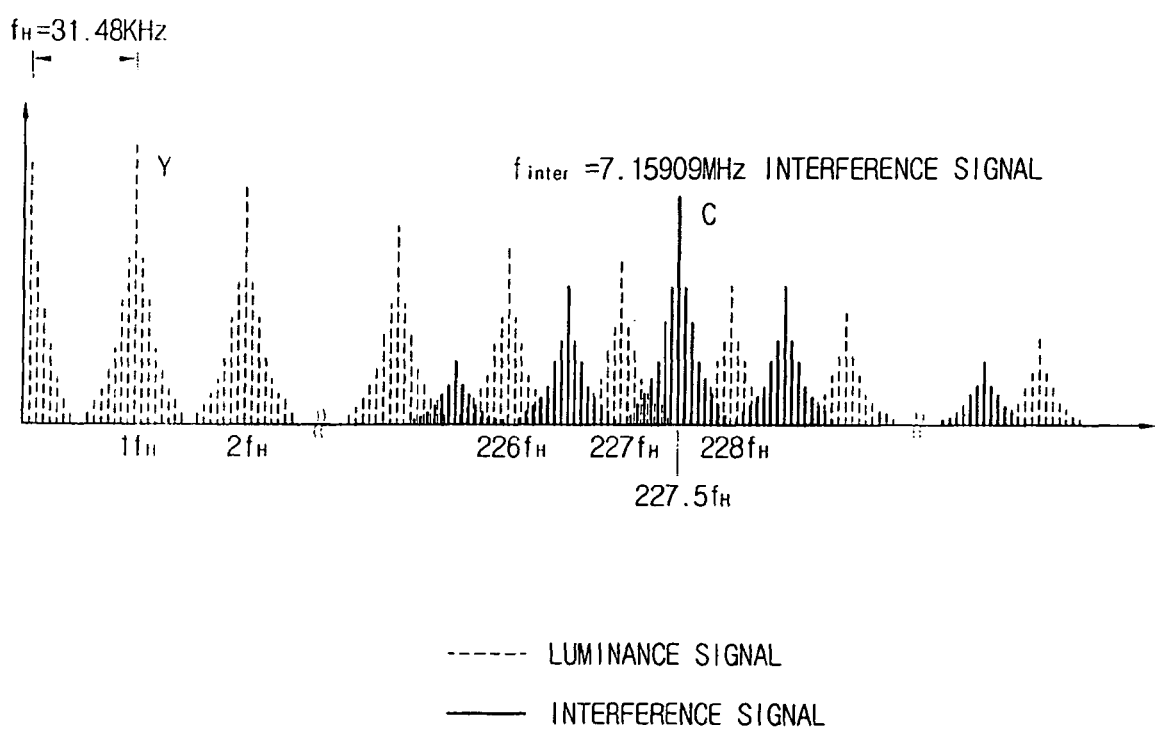
FIG. 2 is a diagram showing an exemplary luminance signal and a color difference noise contained in the luminance signal according to an embodiment of the present invention.

In the digital video processing apparatus of embodiments of the present invention, the luminance signal separated in the decoder 25 may be represented as shown in FIG. 2. In FIG. 2, the x axis denotes a frequency and the y axis denotes a gain.

Here, a horizontal synchronization frequency is defined by $f_H$. In general, as shown in FIG. 2, the horizontal synchronization frequency has a period of 31.48 KHz, and an interference signal is distributed on the basis of 227.5 periods of the horizontal synchronization frequency.

Here, an example reference frequency of the interference signal, $f_{inter}$, may be 7.15909 MHz ($=f_H \times 227.5$). Accordingly, for example, the filtering part 30 can comprise a low pass filter of 7 MHz, a notch filter of 7.1590±0.5 MHz, and so forth. Here, a frequency filtered as shown above is merely one example, and may have a fixed value, but may be adjusted based on a result of the determination in the above-mentioned motion determining part.

In addition, the controlling part 90 can control the filtering part 30 to remove an interference signal corresponding to regions of 226.5 $f_H$, 228.5 $f_H$, and so forth, as well as a region adjacent to 227.5 $f_H$.

Figure 3:
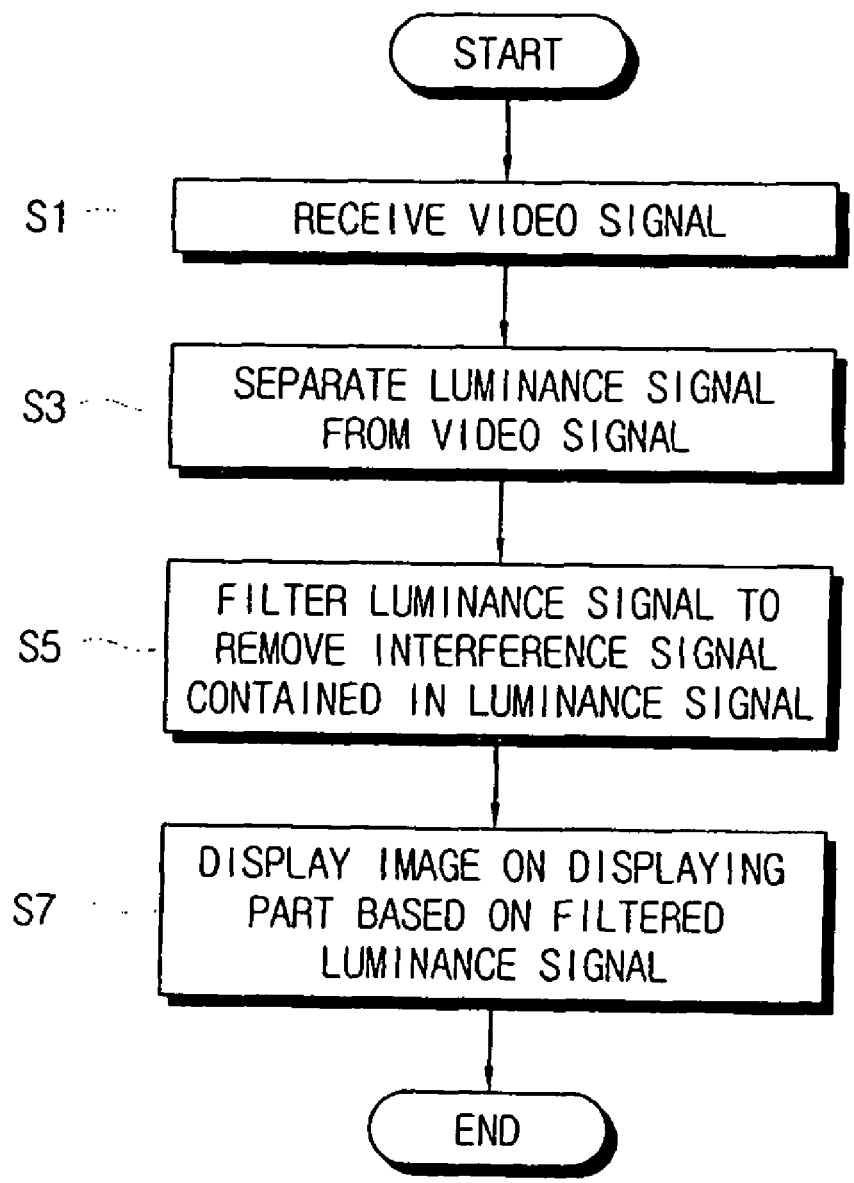
FIG. 3 is a control flow chart of an exemplary digital video processing apparatus according to an embodiment of the present invention.

FIG. 3 is a control flow chart of an exemplary digital video processing apparatus according to an embodiment of the present invention. Referring to FIG. 3, the digital video processing apparatus of embodiments of the present invention receives a broadcasting signal from an external source at operation S1. The broadcasting signal is subject to a modulation process, and is then separated into a video signal, an audio signal, and data, as described above. Then, the decoder 25 separates a luminance signal from the video signal at operation S3.

The filtering part 30 filters an interference signal out of the luminance signal at operation S5. In this case, the filtering part 30 can comprise at least one of a low pass filter and a notch filter. Then, the controlling part 90 can determine which of the low pass filter and the notch filter filters the luminance signal or may determine a region to be filtered, to control the filtering part 30, based on a result of the determination of the above-mentioned motion determining part.

After the filtered luminance signal is input to the signal processing part 50 in which the input filtered luminance signal is subject to a predetermined process, the video signal based on the luminance signal is output to the displaying part 70. Accordingly, an image based on the luminance signal filtered in the filtering part 30 is displayed on the displaying part 70 at operation S7.

In the digital video processing apparatus of embodiments of the present invention, the displaying part 70 may be incorporated into the digital video processing apparatus, or may be provided as a separate device.

For example, if the digital video processing apparatus of embodiments of the present invention is a set-top box, which is separated from a digital TV, it does not include the displaying part 70. However, if the digital video processing apparatus of embodiments of the present invention is a digital TV, it includes the displaying part 70.

As described above, in the digital video processing apparatus of embodiments of the present invention, problems of dot crawl, hanging dot and so forth, can be solved by substantially removing the interference signal such as the color difference noise contained in the luminance signal, which results in an improvement of image quality.

As apparent from the above description, embodiments of the present invention provide the digital video processing apparatus, which is capable of filtering the interference signal contained in the luminance signal, and provide a control method thereof.

Although a number of exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A digital video processing apparatus, comprising:
   a signal receiving part for receiving a digital video signal;
   a decoder for separating a luminance signal from the digital video signal;
   a filtering part for filtering the luminance signal separated by the decoder to substantially remove an interference signal contained in the luminance signal; and
   a controlling part for determining a gain variation of the luminance signal for each frame and controlling the filtering part such that a region of the luminance signal to filter is adjusted based on the determined gain variation.

2. The digital video processing apparatus according to claim 1, further comprising:
   a displaying part,
   wherein the filtering part outputs the digital video signal based on the filtered luminance signal to the displaying part.

3. The digital video processing apparatus according to claim 2, wherein the filtering part comprises at least one of a low pass filter and a notch filter.

4. The digital video processing apparatus according to claim 2, wherein the filtering part comprises:
   at least one of a low pass filter and a notch filter; and
   a controlling part for determining a gain variation of the luminance signal for each frame and controlling one of the low pass filter and the notch filter included in the filtering part to filter the luminance signal based on the determined gain variation.

5. The digital video processing apparatus according to claim 4, wherein the controlling part comprises:
   a motion determining part for determining motion of an object between respective frames and the controlling part determines the gain variation of the luminance signal based on a result of the determination of the motion determining part.

6. The digital video processing apparatus according to claim 1, wherein the controlling part comprises:
   a motion determining part for determining motion of an object between respective frames and the controlling part determines the gain variation of the luminance signal based on a result of the determination of the motion determining part.

7. The digital video processing apparatus according to claim 1, wherein the interference signal comprises a remaining color difference signal component contained in the luminance signal after separation in the decoder.

8. The digital video processing apparatus according to claim 7, wherein the filtering part is configured to filter the color difference signal component from the luminance signal separated in the decoder to substantially remove the interference signal contained in the luminance signal.

9. A method of controlling a digital video processing apparatus, comprising:
   receiving a digital video signal;
   separating a luminance signal from the digital video signal; and
   filtering the separated luminance signal to substantially remove an interference signal contained in the luminance signal;
   wherein the filtering of the separated luminance signal comprises:
   determining a gain variation of the luminance signal for each frame; and
   adjusting a region of the luminance signal to filter based on the determined gain variation.

10. The method according to claim 9, wherein the filtering of the separated luminance signal comprises:
   passing only the luminance signal having a predetermined frequency.

11. The method according to claim 9, wherein the filtering of the separated luminance signal comprises:
   determining motion of an object between frames; and
   determining the gain variation of the luminance signal based on the determined motion of the object.

12. The method according to claim 9, wherein the interference signal comprises a remaining color difference signal component contained in the luminance signal after separation in the decoder.

13. The method according to claim 9, wherein the filtering of the separated luminance signal comprises:
   filtering the color difference signal component from the luminance signal separated in the decoder to substantially remove the interference signal contained in the luminance signal.

14. A method of controlling a digital video processing apparatus, comprising:
   receiving a digital video signal;
   separating a luminance signal from the digital video signal, wherein a remaining color difference signal component is contained in the luminance signal after separation; and
   filtering the separated luminance signal to substantially remove the remaining color difference signal component contained in the luminance signal, wherein the filtering of the separated luminance signal comprises:
determining a gain variation of the luminance signal for each frame; and
adjusting a region of the luminance signal to filter based on the determined gain variation.

* * * * *